(12) United States Patent
Wang et al.

(10) Patent No.: US 7,834,932 B2
(45) Date of Patent: Nov. 16, 2010

(54) DE-INTERLACING METHOD

(75) Inventors: Yu-Chang Wang, Hsinchu (TW);
Chih-Wei Ke, Taipei County (TW);
Kuo-Han Hsu, Kaohsiung (TW)

(73) Assignee: Faraday Technology Corp.,
Science-Based Industrial Park, Hsin-Chu
(TW)

( * ) Notice: Subject to any disclaimer, the term of this patent is extended or adjusted under 35 U.S.C. 154(b) by 1036 days.

(21) Appl. No.: 11/560,022

(22) Filed: Nov. 15, 2006

(65) Prior Publication Data

US 2008/0111915 A1 May 15, 2008

(51) Int. Cl.
*H04N 7/01* (2006.01)
*H04N 11/20* (2006.01)

(52) U.S. Cl. ...................... 348/448; 348/458

(58) Field of Classification Search ......... 348/448–458, 348/700, 701; 382/299–301
See application file for complete search history.

(56) References Cited

U.S. PATENT DOCUMENTS

| | | | | |
|---|---|---|---|---|
| 5,019,903 A * | 5/1991 | Dougall et al. | ............. | 348/448 |
| 5,786,862 A * | 7/1998 | Kim et al. | ................... | 348/448 |
| 7,116,372 B2 * | 10/2006 | Kondo et al. | ................ | 348/448 |
| 7,190,406 B2 * | 3/2007 | Ji et al. | ........................ | 348/448 |
| 7,218,354 B2 * | 5/2007 | Tanaka | ........................ | 348/448 |
| 7,423,692 B2 * | 9/2008 | Chen | .......................... | 348/448 |

* cited by examiner

*Primary Examiner*—M. Lee
(74) *Attorney, Agent, or Firm*—Winston Hsu; Scott Margo

(57) ABSTRACT

An image de-interlacing method for estimating an interpolation luminance of an interpolated pixel, including: selecting a plurality of first and second candidate pixels respectively on upper and lower lines adjacent to the interpolated pixel, calculating a plurality of weighted directional differences respectively associated with one of the first candidate pixels and one of the second candidate pixels with weighting values determined by comparing similarity of luminance decreasing/increasing patterns near the associated first and second candidate pixels on the upper and lower lines, selecting a first selected pixel and a second selected pixel respectively from the first and second candidate pixels associated with the smallest weighted directional difference, and obtaining the interpolation luminance according to the first and second selected pixels.

24 Claims, 12 Drawing Sheets

| | | A | B | C | D | E | |
|---|---|---|---|---|---|---|---|
| $L_U$ | 100 | 100 | 100 | 100 | 65 | 100 | 100 |
| $L_I$ | 100 | 100 | 100 | 60 | 100 | 100 | 100 |
| | | | G | H | I | J | K |
| $L_L$ | 100 | 100 | 67 | 100 | 100 | 100 | 100 |

DE-INTERLACING METHOD

BACKGROUND OF THE INVENTION

1. Field of the Invention

The invention relates to video de-interlacing and more particularly to an video de-interlacing method considering luminance difference vectors adjacent to an interpolated pixel.

2. Description of the Related Art

Progressive display devices display complete frame every refresh. In contrast, interlaced signal, such as NTSC and PAL, typically display even and odd field interlacing. To display interlaced signal on a progressive display device, video rendering systems have to generate pixel data for scan lines that are not received in time for the subsequent field update. This interlace-to-progressive conversion process is referred to as de-interlacing. Current de-interlacing methods comprise intra-field de-interlacing, motion adaptive de-interlacing, and motion compensation deinterlaceing. The intra-field de-interlacing uses a single field to reconstruct one progressive frame. Presently, Directional edge interpolation, also known as edge dependent interpolation (EDI) or edge-based line average (ELA) method, is the most popular algorithm in the intra-field de-interlacing domain.

FIG. 1 illustrates directional edge interpolation using a 5×3 window. An interlaced Line $L_I$ includes interpolated pixels with unknown luminance requiring interpolation with known luminance of two candidate pixels selected from an upper line $L_U$ and lower line $L_L$. If F is a current interpolated pixel with unknown luminance l(F) to be interpolated with luminance of pixels selected from candidate pixels A to E and G to K, then $D_1$, $D_2$, $D_3$, $D_4$, and $D_5$, respectively associated with directions $\vec{d_1}$, $\vec{d_2}$, $\vec{d_3}$, $\vec{d_4}$, and $\vec{d_5}$ represent directional differences around the current interpolated pixel F, defined as:

$$D_1 = |l(A) - l(K)|$$

$$D_2 = |l(B) - l(J)|$$

$$D_3 = |l(C) - l(I)|,$$

$$D_4 = |l(D) - l(H)|$$

$$D_5 = |l(E) - l(G)|$$

where l(pixel name) denotes luminance of a pixel with the pixel name.

ELA uses the direction associated with the smallest difference $D_s$ as the direction with highest correlation, where $D_s$ is defined as:

$$D_s = \min(D_1, D_2, D_3, D_4, D_5).$$

Since pixels on the direction associated with the smallest difference $D_s$ are strongly correlated, the luminance l(F) of the current interpolated pixel F is approximated by interpolation of adjacent pixels on the direction. That is, $$l(F) = \begin{cases} (l(A) + l(K))/2 & \text{if } D_s = D_1 \\ (l(B) + l(J))/2 & \text{if } D_s = D_2 \\ (l(C) + l(I))/2 & \text{if } D_s = D_3 \\ (l(D) + l(H))/2 & \text{if } D_s = D_4 \\ (l(E) + l(G))/2 & \text{if } D_s = D_5 \end{cases}$$

where l(A) to l(K) denotes luminance of pixels A to K.

The ELA algorithm provides acceptable performance in many cases. However, an ambiguous case as shown in FIGS. 2A and 2B may occur. FIG. 2A shows an original image composing lines $L_U$, $L_I$ and $L_L$ with luminance of each pixel shown by a number. FIG. 2B shows an interlaced image with line $L_I$ missed. ELA uses directions $\vec{d_1}$, $\vec{d_2}$, $\vec{d_3}$ or $\vec{d_5}$ as the direction with highest correlation since the directional differences thereof are all $|100-100|=0$. However, the direction $\vec{d_4}$ is the correct interpolation direction even though the directional difference thereof is $|65-67|=2$, greater than 0.

BRIEF SUMMARY OF THE INVENTION

Accordingly, the invention provides an image de-interlacing method preventing erroneous judgment of direction with highest correlation in such an ambiguous case.

The invention provides an image de-interlacing method for estimating an interpolation luminance of an interpolated pixel. A plurality of first and second candidate pixels is selected respectively on upper and lower lines adjacent to the interpolated pixel. Next, a plurality of directional differences, a plurality of weighting values and a plurality of weighted directional differences are calculated, each associated with one of the first candidate pixels and one of the second candidate pixels. Each of the directional differences is an absolute luminance difference between the associated first and second candidate pixels. Each of the weighting values is determined by comparing similarity of luminance decreasing/increasing patterns near the associated first and second candidate pixels. Each of the weighted directional differences is determined according to the directional difference and the weighting value. Next, a first selected pixel and a second selected pixel are selected respectively from the first and second candidate pixels associated with the smallest weighted directional difference. Finally, the interpolation luminance is obtained according to the first and second selected pixels.

First and second luminance difference vectors are used for convenience to define mathematically luminance decreasing/increasing patterns near the associated first and second candidate pixels. More specifically, each of the weighting values is determined by comparing a first luminance difference vector of a first weighting region with a second luminance difference vector of a second weighting region. The first and second weighting regions respectively reside on the upper and lower lines and comprise the associated first and second candidate pixels. Each element of the first and second luminance difference vectors is respectively determined according to luminance difference between two adjacent pixels associated with the elements in the first and second weighting regions

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
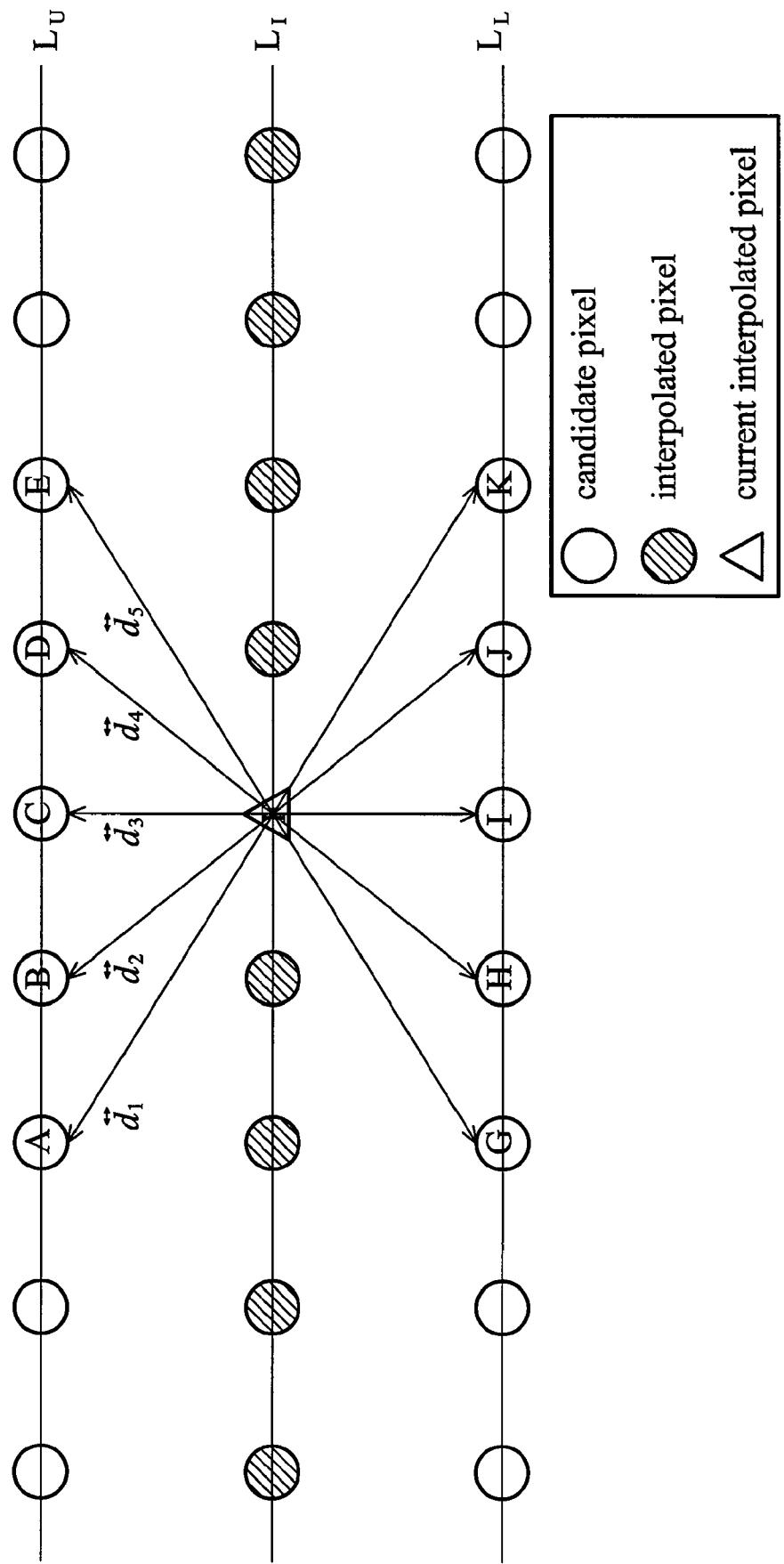
FIG. 1 illustrates conventional directional edge interpolation using a 5×3 window.
Figures 2A, 2B:
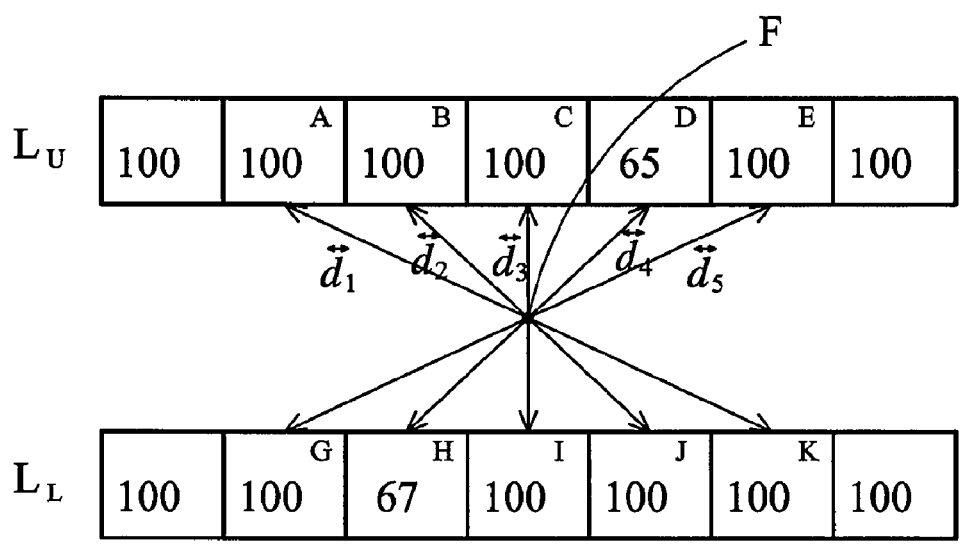
FIGS. 2A and 2B show an ambiguous case in conventional directional edge interpolation of FIG. 1.

Referring to FIGS. 2A and 2B, it is noted that luminance decreasing/increasing pattern between pixel C, D, E in line $L_U$ is similar to that between pixel G, H, I in line $L_L$, both luminance being decreased and then increased from left to right. In the following, improved de-interlacing is provided in several embodiments to prevent erroneous judgment as shown in FIGS. 2A and 2B by considering not only the directional differences associated with different candidate pixels on the upper and lower lines $L_U$ and $L_L$ but also similarity of luminance decreasing/increasing patterns near the candidate pixels.

Figure 3:
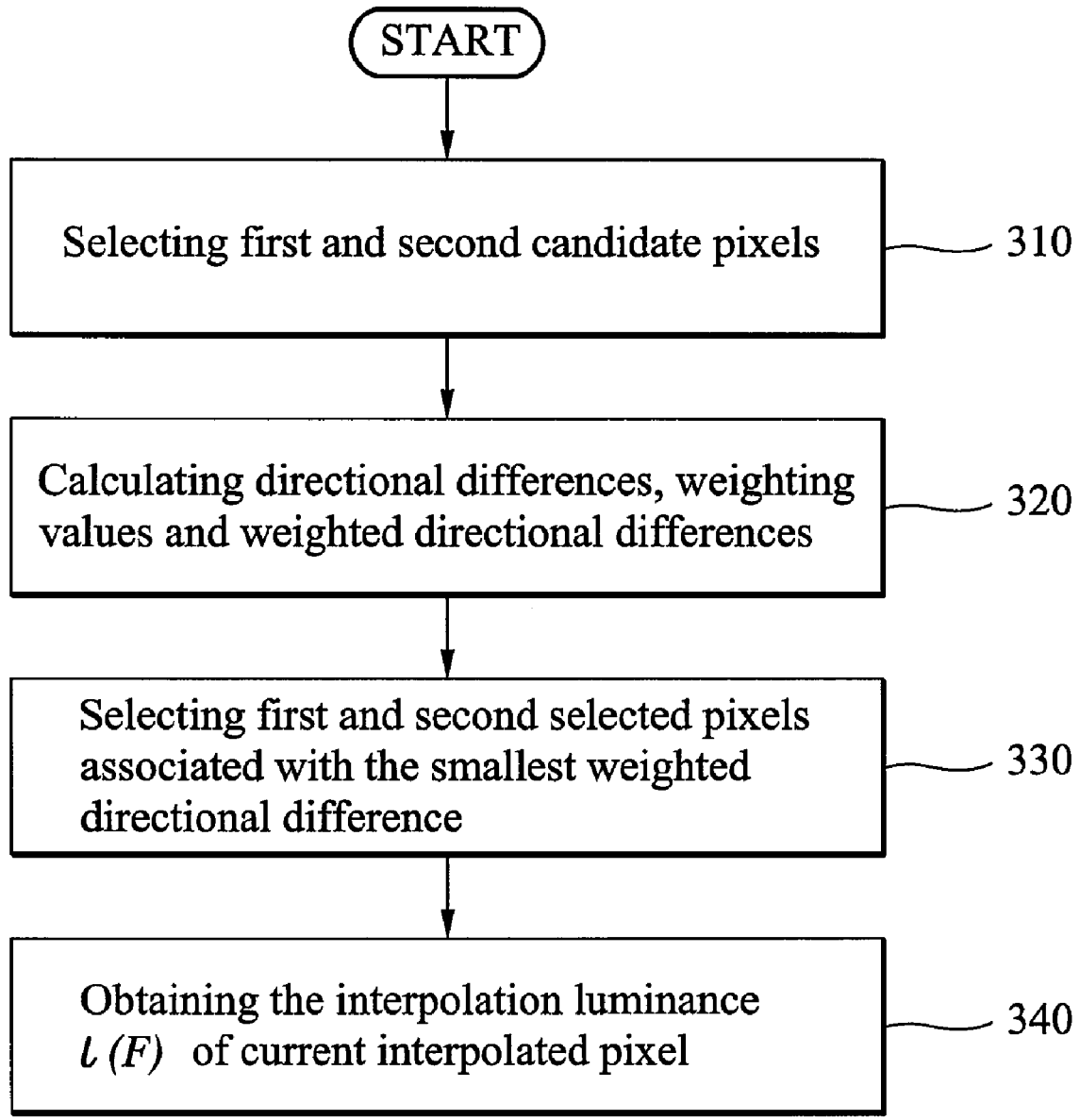
FIG. 3 is a flowchart of an image de-interlacing method in accordance with an embodiment of the invention.
Figure 4:
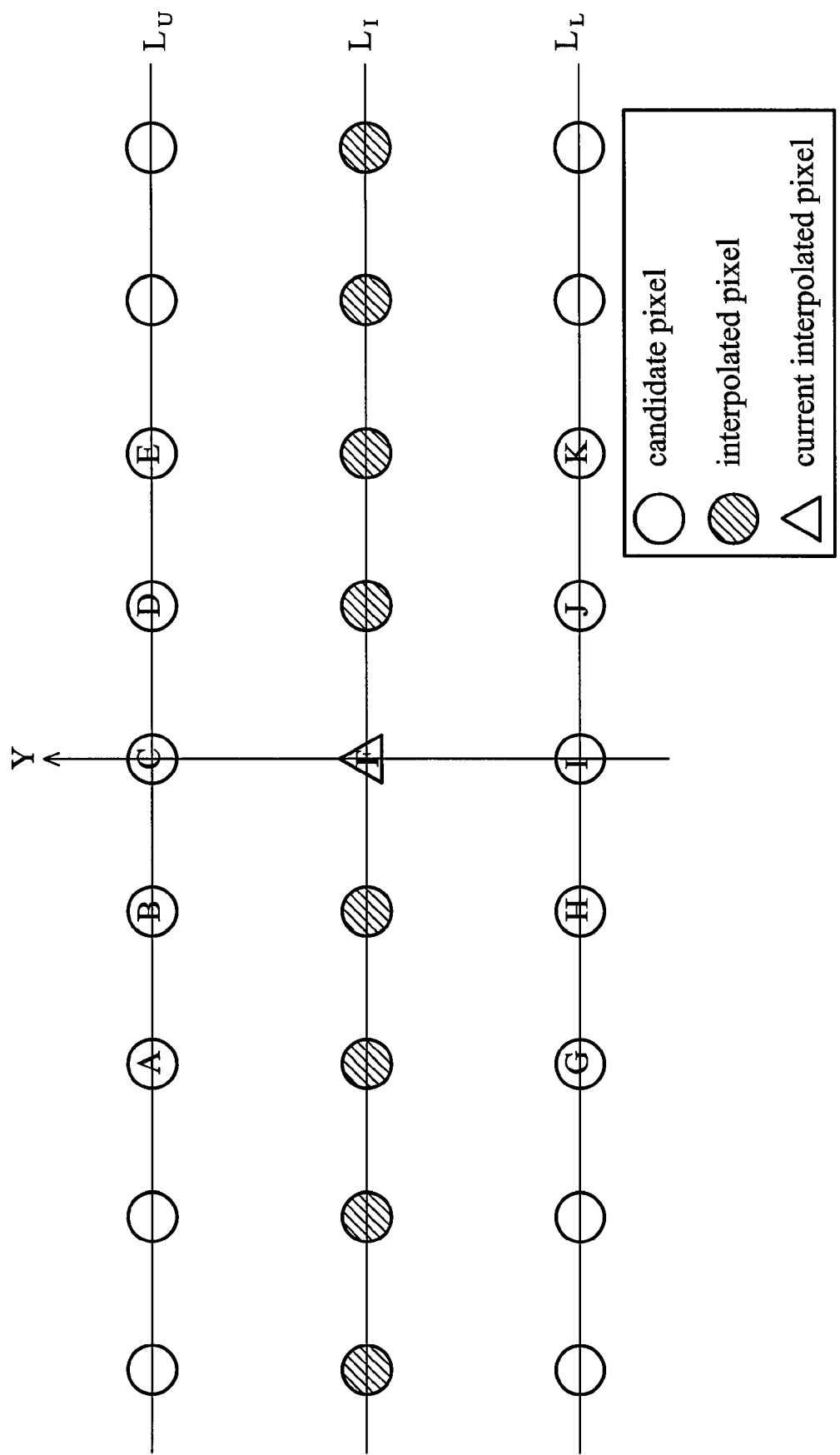
FIG. 4 illustrates selection of first and second candidate pixels of FIG. 3.

FIG. 3 is a flowchart of an image de-interlacing method in accordance with an embodiment of the invention. Step 310 is described with reference to FIG. 4 as follows. In step 310, N1 (N1=5 in FIG. 4) pixels A, B, C, D, E on an upper line $L_U$ adjacent to a current interpolated pixel F on an interpolated line $L_I$ are selected as first candidate pixels, and N2 (N2=5 in FIG. 4) pixels G, H, I, J, K on a lower line $L_L$ adjacent to the current interpolated pixel F are selected as second candidate pixels.

For convenience, pixels are here referred to also by p(x,y), where x and y respectively denote positions relative to the current interpolated pixel F on the X and Y axes. For example, the first candidate pixels A, B, C, D, E are also referred to by p(−2,1), p(−1,1), p(0,1), p(1,1) and p(2,1), respectively, the current interpolated pixel F is referred to by p(0,0), and the second candidate pixels G, H, I, J, K are referred to by p(−2,−1), p(−1,−1), p(0,−1), p(1,−1) and p(2,−1), respectively.

Figure 5:
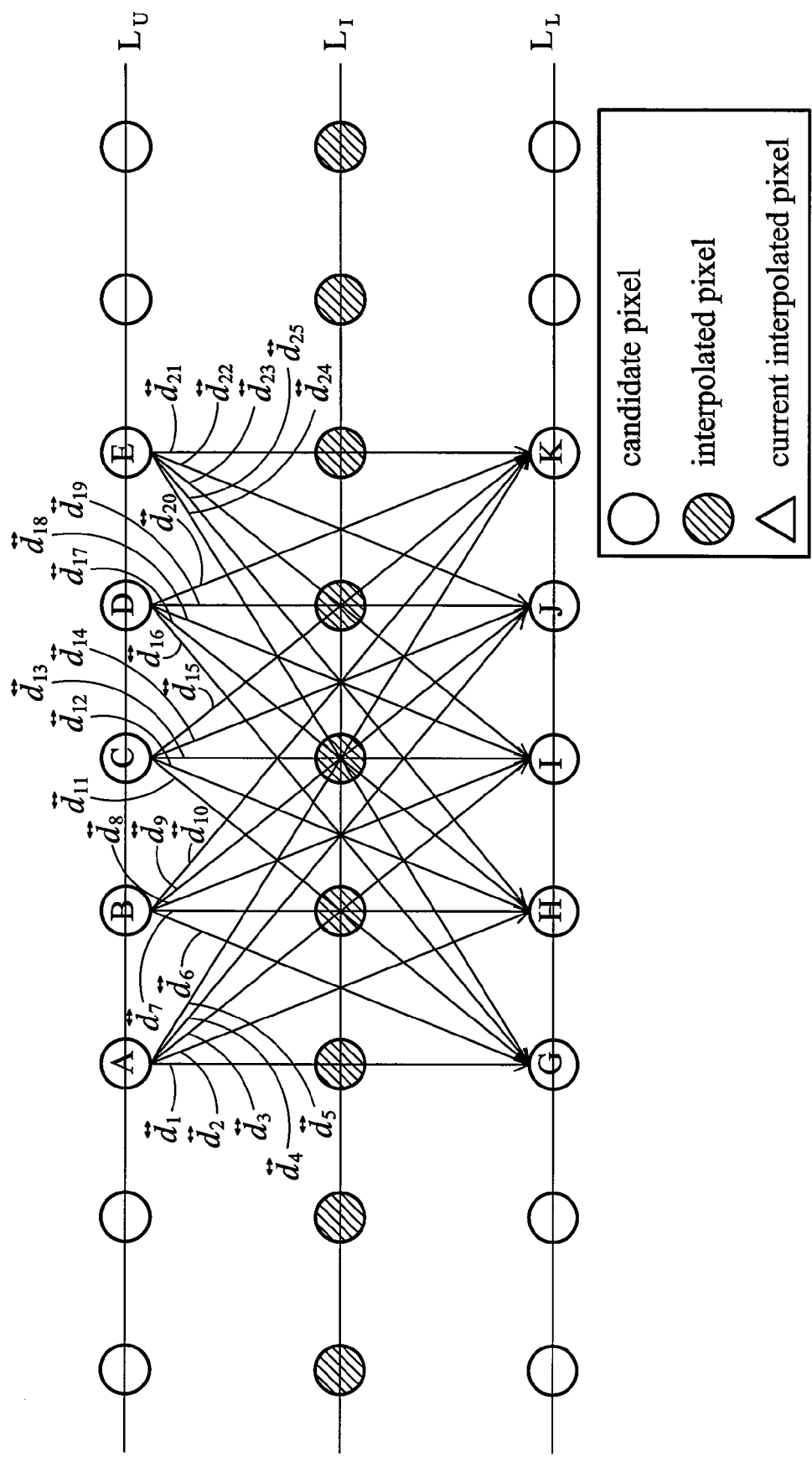
FIG. 5 illustrates 25 directions associated of FIG. 3.

Step 320 is described with reference to FIG. 5 as follows. In step 320, N3 (such as 19, or 25 in the figure) directional differences diff(l,m), N3 weighting values W(l, m), and N3 weighted directional differences DIFF(l,m), are calculated, each associated with one of directions $\vec{d}_1$ to $\vec{d}_{N3}$ extending between one pixel p(l,1) among the first candidate pixels A to E and one pixel p(m,−1) of the second candidate pixels G to K (−2≦l,m≦2 in FIG. 4). The respective relations of the directional difference diff(l,m), the weighting value W(l,m), and the weighted directional difference DIFF(l,m), with the first candidate pixel p(l,1) and the second candidate pixel p(m,−1), are specified as follows.

The directional difference diff(l,m) is defined as $$diff(l,m)=|l(l,1)-l(m,-1)|,$$

where l(x,y) denotes the luminance of a pixel p(x,y).

Figure 6:
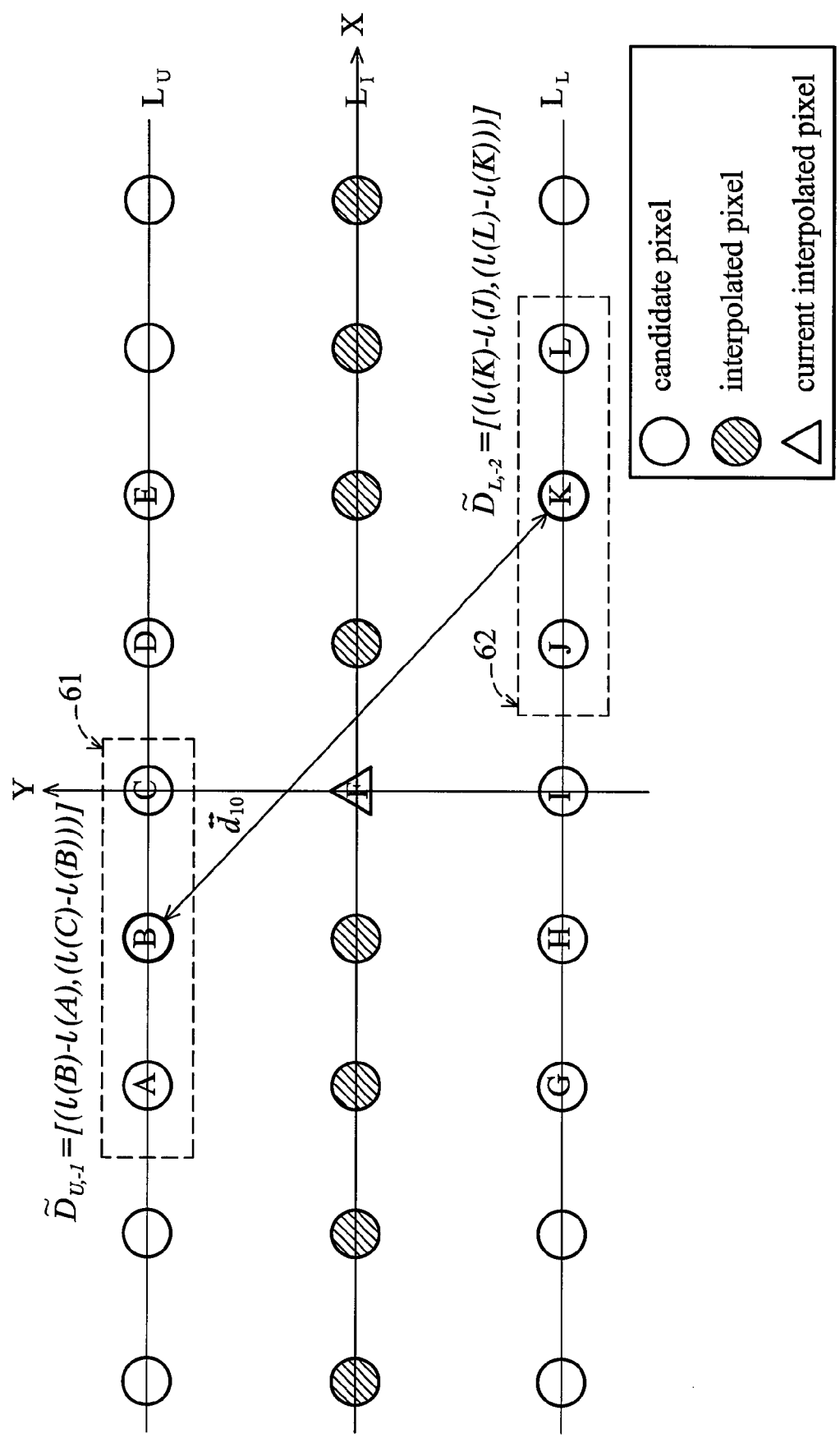
FIG. 6 illustrates first and second luminance vectors of first and second weighting regions of FIG. 3.

FIG. 6 illustrates determination of weighting value W(l,m), with (l,m)=(−1,2) used as an example, and other values of (l,m) can be readily analogized. In the invention, the decreasing/increasing patterns respectively near the first candidate pixel P(l,1)=P(−1,1) and the second candidate pixel P(m,−1)=P(2,−1) are mathematically defined as the signs of elements of first and second luminance difference vectors $\tilde{D}_{U,-1}$ and $\tilde{D}_{L,2}$.

As shown in FIG. 6, a first weighting region 61 includes three pixels P(−2,1), P(−1,1), and P(0,1) (i.e. pixels A, B, and C), and a second weighting region 62 includes three pixels P(1,−1), P(2,−1), and P(3,−1) (i.e. pixels J, K, and L). Note that the ranges of the first and second weighting region 61 and 62 can be designed as required (for example, to include 5 rather than 3 pixels respectively) as long as it includes the first candidate pixel P(l,1)=P(−1,1). Preferably, the first candidate pixel P(l,1)=P(−1,1) and the second candidate pixel P(m,−1)=P(2,−1) reside in the middle of the first and second weighting regions 61 and 62, respectively. Each element of the first luminance difference vector $\tilde{D}_{U,-1}$ is determined according to luminance difference between two pixels associated with the element in the first weighting region 61. Similarly, each element of the second luminance difference vector $\tilde{D}_{L,2}$ is determined according to luminance difference between two pixels associated with the element in the second weighting region 62. In an embodiment, $$\tilde{D}_{U,-1}=[\tilde{D}_{U,-1}[1], \tilde{D}_{U,-1}[2]]=[(l(-1,1)-l(-2,1)),(l(0,1)-l(-1,1))]=[(l(B)-l(A),(l(C)-l(B)))]$$

and $$\tilde{D}_{L,2}=[\tilde{D}_{L,2}[1], \tilde{D}_{L,2}[2]]=[(l(2,-1)-l(1,1)),(l(3,-1)-l(2,-1))]=[(l(K)-l(J),(l(L)-l(K)))].$$

The weighting value W(−1,2) is then determined according to similarity in signs of corresponding elements of the first and second luminance difference vectors $\tilde{D}_{U,-1}$ and $\tilde{D}_{L,2}$. Higher similarity means more corresponding elements satisfying sign($\tilde{D}_{U,-1}[i]$)=sign($\tilde{D}_{L,2}[i]$), where 1≦i≦dim, and dim denote the dimension of the first luminance difference vector $\tilde{D}_{U,-1}$ (or the dimension of the second luminance difference vector $\tilde{D}_{L,2}$) and dim=2 in FIG. 6. Note that $\tilde{D}_{U,-1}[i]=\tilde{D}_{L,2}[i]=0$ does not satisfy this equation, as is indicated by FIGS. 2A and 2B.

In an embodiment, the weighting value W(−1,2) is determined according to at least one sub-weighting value $w_j(-1,2)$, where 1≦i≦J and J is an integer greater than 1 and each of the sub-weighting value $w_j(-1,2)$ is determined according to similarity in signs of corresponding elements of a first sub-luminance difference vector $\tilde{d}_{U,-1,j}$ and a second sub-luminance difference vector $\tilde{d}_{L,2,j}$ respectively comprising partial elements of the first and second luminance difference vectors $\tilde{D}_{U,-1}$ and $\tilde{D}_{L,2}$. In an embodiment, $$W(-1, 2) = \prod_{1 \leq j \leq J} w_j(-1, 2) + w_{off},$$

wherein $w_{off}$ is a predetermined offset value.

Figure 7:
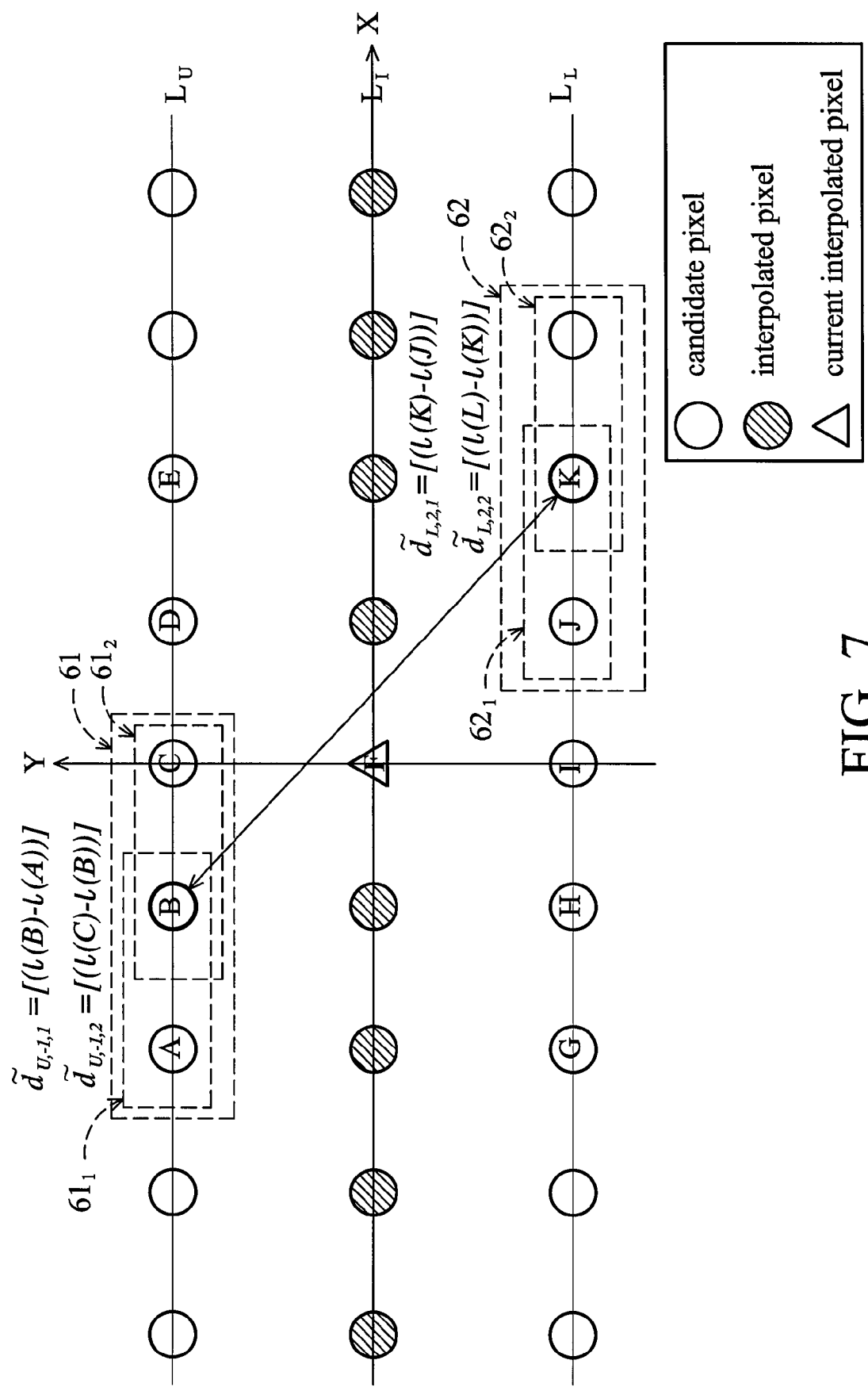
FIG. 7 illustrates first and second sub-luminance vectors of first and second sub-weighting regions of FIG. 3.

FIG. 7 illustrates the respective relationship between the first and second sub-luminance vectors $\tilde{d}_{U,-1,j}$ and $\tilde{d}_{L,2,j}$ and the first and second luminance difference vectors $\tilde{D}_{U,-1}$ and $\tilde{D}_{L,2}$ by taking J=2 as an example. As shown, the first weighting region 61 is partitioned into J (J=2) partially-overlapped first sub-weighting regions $61_1$ and $61_2$, and similarly, the second weighting region 62 is partitioned into J (J=2 in the example) partially-overlapped second sub-weighting regions $62_1$ and $62_2$. Similar to determination of elements of the first and second luminance difference vectors $\tilde{D}_{U,-1}$ and $\tilde{D}_{L,2}$, each element of the first sub-luminance difference vectors $d_{U,-1,1}$ (or $d_{U,-1,2}$) is determined according to luminance difference between two adjacent points in the first sub-weighting region $61_1$ ($61_2$), and similarly, each element of the second sub-luminance difference vectors $d_{L,2,1}$ (or $d_{L,2,2}$) is determined according to luminance difference between two adjacent points in the first sub-weighting region $61_1$ ($61_2$). For example, the first and second sub-luminance difference vectors $d_{U,-1,j}$ and $d_{L,2,j}$ are:

$$d_{U,-1,1}=[d_{U,-1,1}[1]]=[(l(-1,1)-l(-2,1))]=[(l(B)-l(A))],$$

$$d_{U,-1,2}=[d_{U,-1,2}[2]]=[(l(0,1)-l(-1,1))]=[(l(C)-l(B))],$$

$$d_{L,2,1}=[d_{L,2,1}[1]]=[(l(2,-1)-l(1,-1))]=[(l(K)-l(J))],$$
and $$d_{L,2,2}=[d_{L,2,2}[2]]=[(l(3,-1)-l(2,-1))]=[(l(L)-l(K))].$$

In other words, the first and second sub-luminance difference vectors $d_{U,-1,j}$ and $d_{L,2,j}$ comprise partial elements of the first and second luminance difference vectors $\tilde{D}_{U,-1}$ and $\tilde{D}_{L,2}$. The following embodiments illustrate determination of the sub-weighting value $w_j(-1,2)$ according to similarity in signs of corresponding elements of the first and second sub-luminance difference vectors $d_{U,-1,j}$ and $d_{L,2,j}$.

First embodiment: in the embodiment, the sub-weighting values $w_j(-1,2)$ determined according to the first and second sub-luminance difference vectors $d_{U,-1,j}$ and $d_{L,2,j}$ with element values having higher similarity in signs are set lower than the weighting value $w_j(-1,2)$ determined according to the first and second sub-luminance difference vectors $d_{U,-1,j}$ and $d_{L,2,j}$ with element values having lower similarity in signs.

For example, the sub-weighting value $w_j(-1,2)$ is set to one $vp_j(I_j)$ of a plurality of decreasing predetermined values $vp_j(0)$ to $vp_j(\dim_j)$, wherein $I_j$ denotes the number of i satisfying $\text{sign}(d_{U,-1,j}[i])=\text{sign}(d_{L,2,j}[i])$ and $\dim_j$ denotes the dimension of the first and second sub-luminance difference vectors $d_{U,-1,j}$ and $d_{L,2,j}$. Note that $d_{U,-1,j}[i]=d_{L,2,j}[i]=0$ does not satisfy this equation. Preferably, $vp_j(I_j)$ are equal for different values of j. More specifically, when $d_{U,-1,j}[1]$ and $d_{1,1,j}[1]$ are equal in signs ($I_j=1$), the sub-weighting value $w_j(-1,2)$ is set to the predetermined value $vp_j(1)$. When $d_{U,-1,j}[1]$ and $d_{L,2,j}[1]$ are unequal in signs ($I_j=0$), the sub-weighting value $w_j(-1,2)$ is set to the predetermined value $vp_j(0)$.

Resultingly, the weighting value $W(-1,2)$ is set to is set to one value $vp(I)$ of a plurality of decreasing predetermined values $vp(1)$ to $vp(\dim)$, wherein I denotes the number of i satisfying $\text{sign}(\tilde{D}_{U,-1}[i])=\text{sign}(\tilde{D}_{L,2}[i])$ and $vp(0)=vp_1(0)vp_2(0)+w_{off}$, $vp(1)=vp_1(0)vp_2(1)+w_{off}$ (or $vp(1)=vp_1(1)vp_2(0)+w_{off}$) and $vp(2)=vp_1(1)vp_2(1)+w_{off}$. It is noted that $I_j$ and I have such a relation:

$$I = \sum_{1 \leq j \leq 2} I_j.$$

In other words, the weighting value $W(-1,2)$ is simply determined according to similarity in signs of corresponding elements of the first and second luminance difference vectors $\tilde{D}_{U,-1}$ and $\tilde{D}_{L,2}$ in this embodiment. The weighting value $W(-1,2)$ determined according to first and second luminance difference vectors $\tilde{D}_{U,-1}$ and $\tilde{D}_{L,2}$ with element values having higher similarity in signs are set lower than the weighting value $W(-1,2)$ determined according to first and second luminance difference vectors $\tilde{D}_{U,-1}$ and $\tilde{D}_{L,2}$ with element values having lower similarity in signs, since the correlation between the first and second candidate pixels $p(1,1)$ and $p(m,-1)$ in the former case is stronger than in the latter case, as is indicated by FIGS. 2A and 2B.

Second embodiment: in the embodiment, the sub-weighting value $w_j(-1,2)$ is determined according to not only similarity in signs of the element values of the first and second sub-luminance difference vectors $d_{U,-1,j}$ and $d_{L,2,j}$ but also whether absolute values of the elements of the first and second sub-luminance difference vectors $d_{U,-1,j}$ and $d_{L,2,j}$ exceed a predetermined minimum value vpm. The sub-weighting value $w_j(-1,2)$ determined according to the first and second sub-luminance difference vectors $d_{U,-1,j}$ and $d_{L,2,j}$ with more corresponding elements having equal signs and more elements having absolute values greater than a predetermined minimum value vpm are set lower than the sub weighting values $w_j(-1,2)$ determined according to the first and second sub-luminance difference vectors $d_{U,-1,j}$ and $d_{L,2,j}$ with fewer corresponding elements having equal signs and fewer elements having absolute values greater than the predetermined value vpm.

Figure 8:
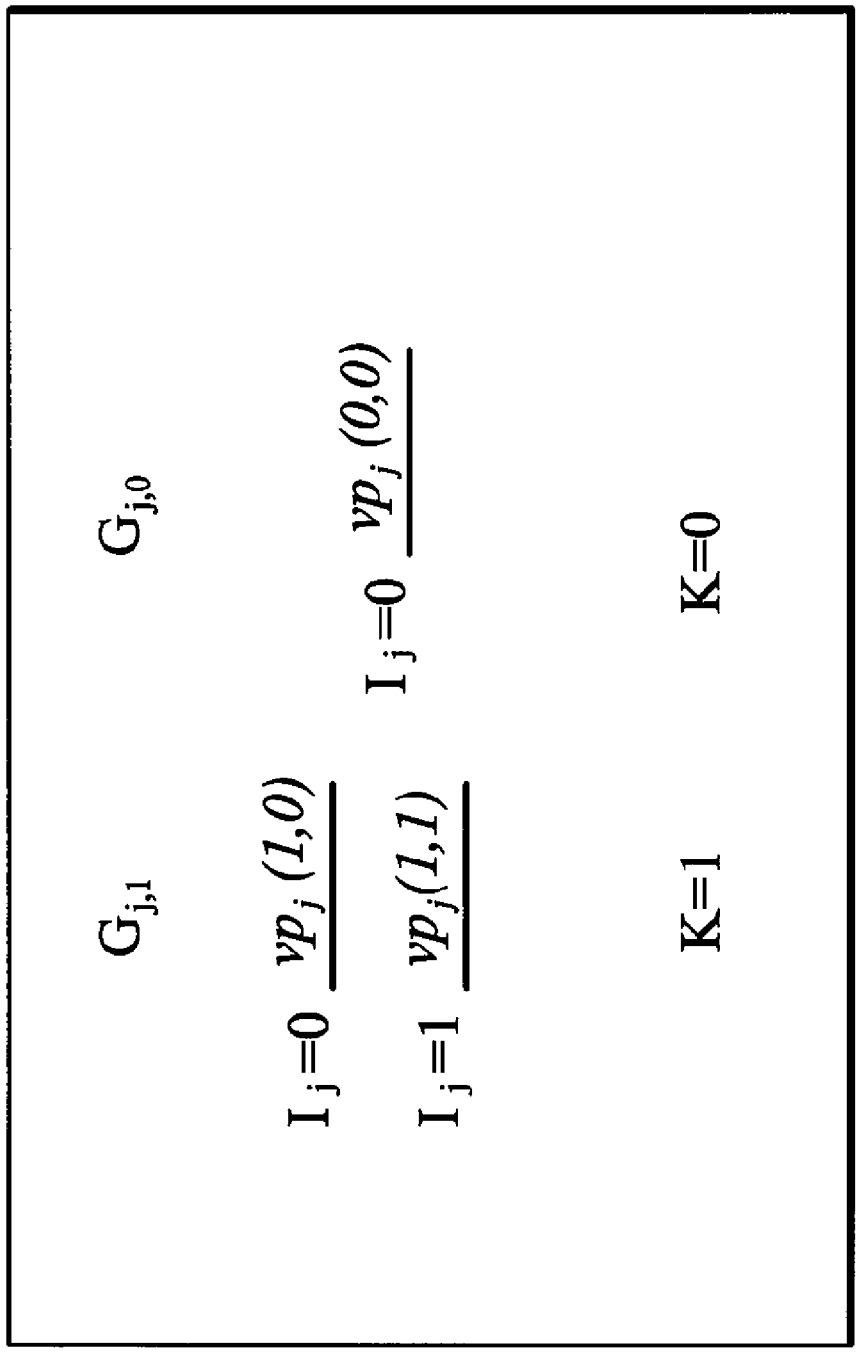
FIG. 8 illustrates arrangement of a weighting value.

FIG. 8 illustrates the setting of the sub-weighting value $w_j(-1,2)$ according to an embodiment of the invention. The sub-weighting value $w_j(-1,2)$ is set to one predetermined value $vp_j(K_j,I_j)$ belonging to one of a plurality of groups $G_{j,0}$ to $G_{j,\dim_j}$, where $\dim_j$ is defined as the element number of the first or second sub-luminance difference vector $d_{U,-1,j}$ or $d_{L,2,j}$, $K_j$ represents the number of k satisfying both $|d_{U,-1,j}[k]| \geq vpm$ and $|d_{L,2,j}[k]| \geq vpm$, and $I_j$ represents the number of i satisfying $\text{sign}(d_{U,-1,j}[i])=\text{sign}(d_{L,2,j}[i])$, $|d_{U,-1,j}[i]| \geq vpm$ and $|d_{L,2,j}[i]| \geq vpm$. Preferably, $vp_j(K_j,I_j)$ are equal for different values of j and can be simplified as $vp(K_j,I_j)$.

More specifically, as shown in FIG. 8, when both $|d_{U,-1,j}[1]|$ and $|d_{L,2,j}[1]|$ exceed vpm, that is, $K_j=1$, the sub-weighting value $w_j(-1,2)$ is set to the predetermined value $vp_j(1,1)$ and $vp_j(1,0)$ respectively when $d_{U,-1,j}[1]$ and $d_{L,2,j}[1]$ are equal ($I_j=1$) an unequal ($I_j=0$) in signs. Otherwise, when at least one of $|d_{U,-1,j}[1]|$ and $|d_{L,2,j}[1]|$ is less than vpm, that is, $K_j=0$, the sub-weighting value $w_j(-1,2)$ is set to $vp_j(0,0)$ no matter $d_{U,-1,j}[1]$ and $d_{L,2,j}[1]$ are equal in signs.

Figure 9:
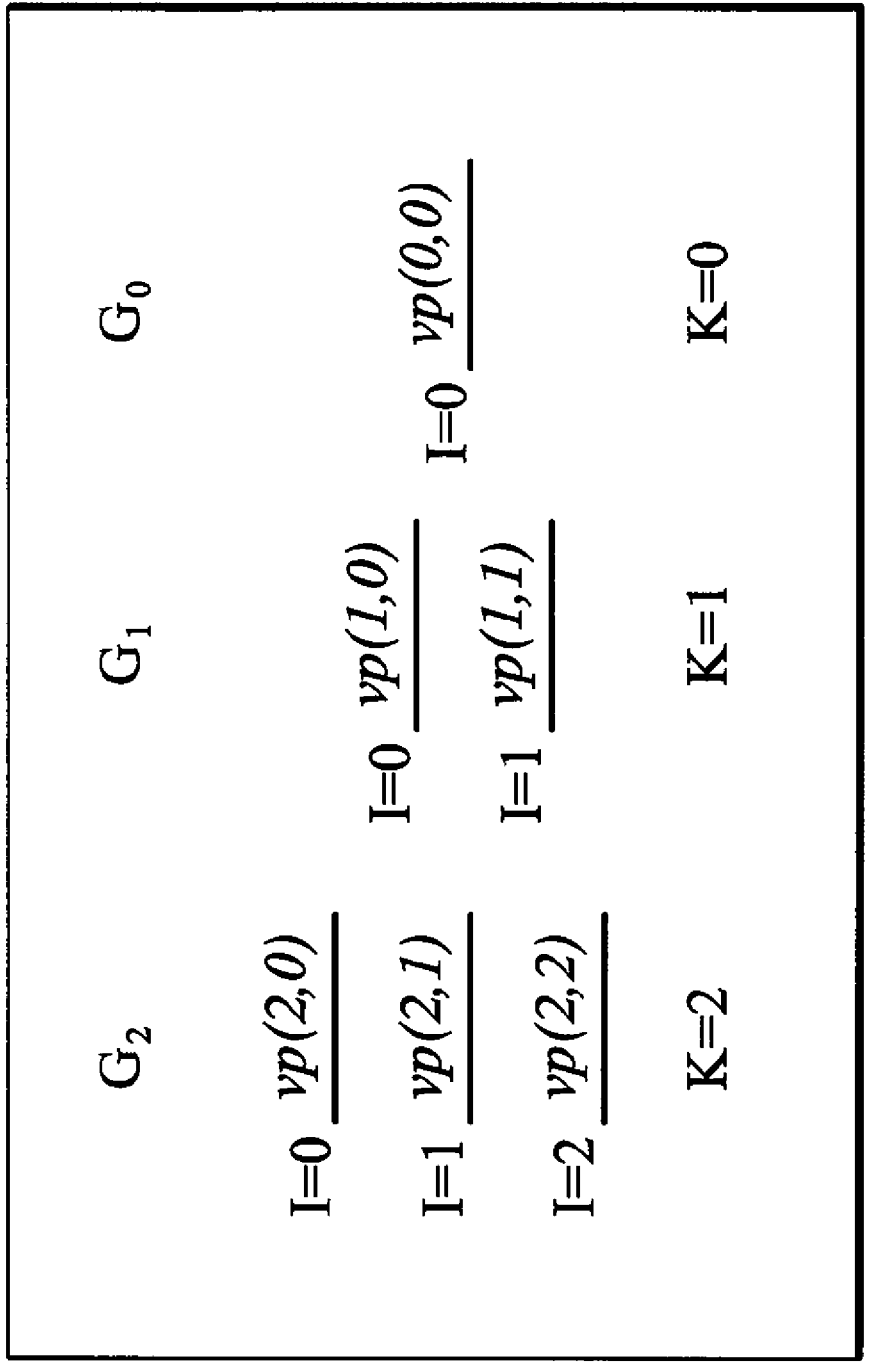
FIG. 9 illustrates arrangement of a sub-weighting value.

FIG. 9 illustrates the resulted setting of the weighting value $W(-1,2)$. As shown, the weighting value $W(-1,2)$ is set to one predetermined value $vp(K,I)$ belonging to one of a plurality of groups $G_0$ to $G_{\dim}$ (dim=2 in the embodiment), where K represents the number of k satisfying both $|\tilde{D}_{U,-1}[k]| \geq vpm$ and $|\tilde{D}_{L,2}[k]| \geq vdm$, I represents the number of i satisfying $\text{sign}(\tilde{D}_{U,-1}[i])=\text{sign}(\tilde{D}_{L,2}[i])$, $|\tilde{D}_{U,-1}[i]| \geq vpm$ and $|\tilde{D}_{L,2}[i]| \geq vpm$, $vp(2,0)=vp_1(1,0)vp_2(1,0)+w_{off}$, $vp(2,1)=vp_1(1,1)vp_2(1,0)+w_{off}$ (or $vp(2,1)=vp_1(1,0)vp_2(1,1)+w_{off}$), $vp(2,2)=vp_1(1,1)vp_2(1,1)+w_{off}$, $vp(1,0)=vp_{j1}(1,0)vp_{j2}(0,0)$, $vp(1,1)=vp_{j1}(1,1)vp_{j2}(0,0)$, and $vp(0,0)=vp_1(0,0)vp_2(0,0)$. It is noted that K and $K_j$ have the relationship:

$$K = \sum_{1 \leq j \leq J} K_j,$$

and I and $I_j$ have the relationship:

$$I = \sum_{1 \le j \le 2} I_j.$$

In other words, the weighting value W(−1,2) in the embodiment is determined according to not only similarity in signs of the element values of the luminance difference vectors $\tilde{D}_{U,-1}$ and $\tilde{D}_{L,2}$ but also whether absolute values of the elements of the first and second luminance difference vectors $\tilde{D}_{U,-1}$ and $\tilde{D}_{L,2}$ exceed a predetermined minimum value vpm. The weighting value W(−1,2) determined according to luminance difference vectors $\tilde{D}_{U,-1}$ and $\tilde{D}_{L,2}$ with more corresponding elements having equal signs and more elements having absolute values greater than the predetermined minimum value vpm are set lower than the weighting values determined according to luminance difference vectors $\tilde{D}_{U,-1}$ and $\tilde{D}_{L,2}$ with fewer corresponding elements having equal signs and fewer elements having absolute values greater than the predetermined value vpm, since elements with greater absolute values are more reliable. Moreover, weighting effect on the weighted directional difference induced by similarity of luminance decreasing/increasing patterns near the first and second candidate pixels can be controlled by adjusting the predetermined minimum value and quality of the de-interlaced image can thus be adjusted.

Referring to FIG. 3 for completion of step 320. After the directional difference diff(l,m) and the weighting value W(l, m) associated with the first candidate pixel p(l,1) and the second candidate pixel p(m,−1) are calculated, the weighted directional difference DIFF(l,m) is determined according to the calculated directional difference diff(l,m) and the weighting value W(l,m). In an embodiment, the weighted directional difference DIFF(l,m) is defined as:

$$DIFF(l,m) = diff(l,m) \cdot W(l,m).$$

After the weighted directional difference DIFF(l,m) is calculated for each (l,m), where −2≦l,m≦2, step 122 is completed.

Next, in step 330, the weighted directional differences DIFFs are compared to find the smallest weighted directional difference DIFF($l_s$,$m_s$), defined as $$DIFF(l_s,m_s) = \min(Diff(l,m), -2 \le l,m \le 2).$$

The first candidate pixel P($l_s$,1) and the second candidate pixel P($m_s$,−1) associated with a selected direction $\overleftrightarrow{d}_s$ having the smallest weighted directional difference DIFF($l_s$,$m_s$) are then selected as a first selected pixel $P_{s1}$ and a second selected pixel $P_{s2}$.

In step 340, the interpolation luminance of the current interpolated pixel F is obtained according to the first and second selected pixels $P_{s1}$ and $P_{s2}$. Since pixels on the direction along the first selected pixel $P_{s1}$ to the second selected pixel $P_{s2}$ are strongly correlated, it is reasonable that the luminance l(F) of the current interpolated pixel F can be approximated by interpolation of adjacent pixels on or near the direction along the first selected pixel $P_{s1}$ to the second selected pixel $P_{s2}$.

Figure 10:
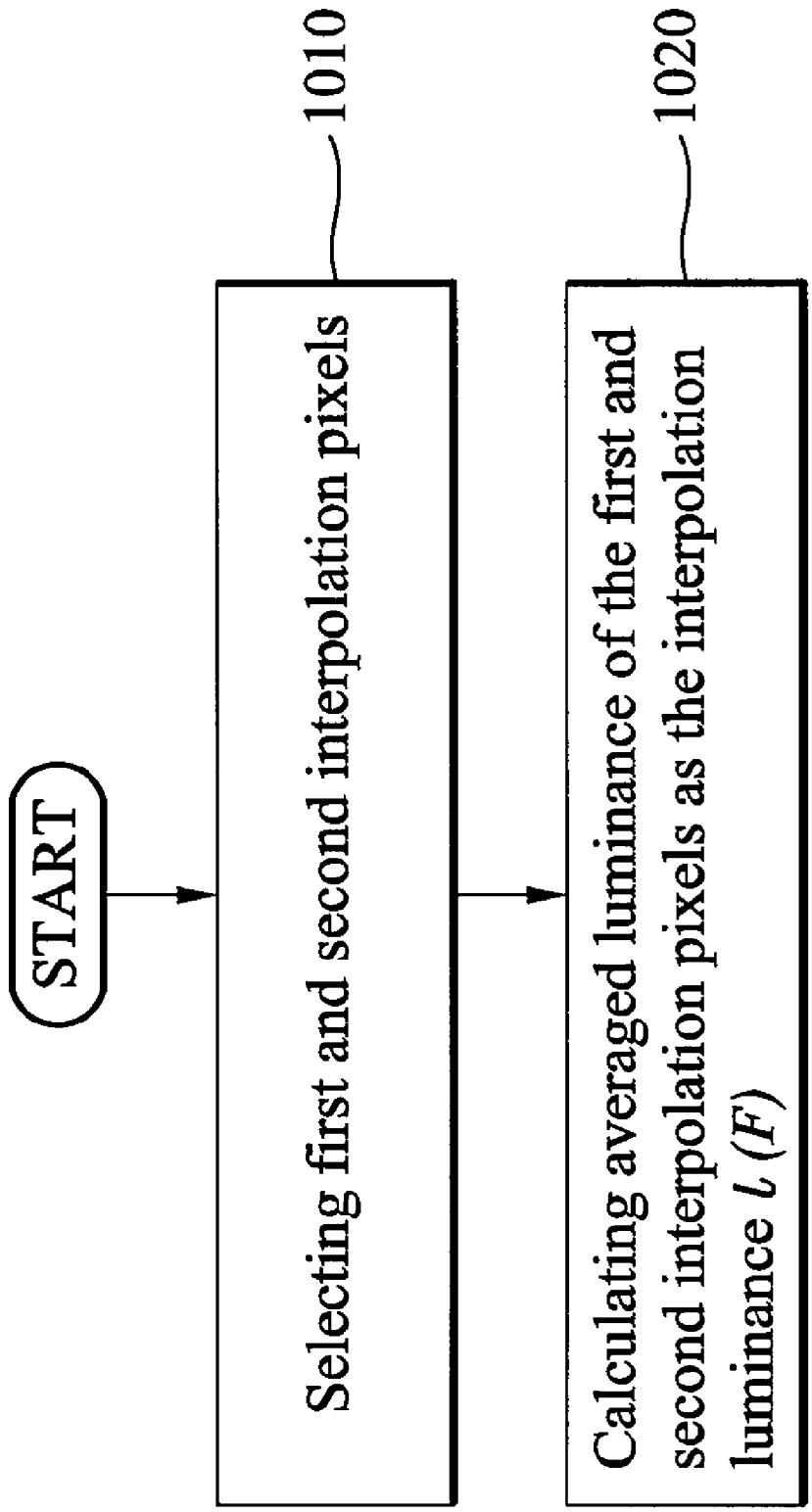
FIG. 10 is a flowchart illustrating acquisition of interpolation luminance of a current interpolated pixel in accordance with a first embodiment of the invention.

FIG. 10 is a flowchart illustrating the acquisition of the interpolation luminance of the current interpolated pixel F in accordance with a first embodiment of the invention. In step 1010, a first predetermined number N1 of pixels comprising the first selected pixel $P_{s1}$ on the upper line $L_U$ are selected as first interpolation pixels $P_{1,1}$ to $P1_{1,N1}$. Similarly, a second predetermined number N2 of pixels in a first interpolation region 51? comprising the second selected pixel $P_{s2}$ on the upper line $L_L$ are selected as second interpolation pixels $P_{2,1}$ to $P1_{2,N2}$. Note that, the first interpolation pixels $P_{1,1}$ to $P1_{1,N1}$ are not required to be different pixels, nor are the second interpolation pixels $P_{2,1}$ to $P1_{2,N2}$. In step 1020, averaged luminance $$\left[ \sum_{1 \le i1 \le N1} l(P_{1,i1}) + \sum_{1 \le i2 \le N2} l(P_{2,i2}) \right] / (N1 + N2)$$

of the first and second interpolation pixels $P_{1,1}$ to $P1_{1,N1}$ and $P_{2,1}$ to $P1_{2,N2}$ is calculated as the interpolation luminance of the current interpolated pixel F. Using N1=N2=2 as an example, $$b(F) = b(0, 0) = \frac{l(P_{1,2}) + l(P_{1,2}) + l(P_{2,1}) + l(P_{2,2})}{4}$$

$$= \frac{l(x1, 1) + l(x2, 1) + l(x3, -1) + l(x4, -1)}{4}$$

Table. 1 shows the relations between x1, x2, x3, x4 and ($l_s$,$m_s$).

| ($l_s$, $m_s$) | $\overleftrightarrow{d}_s$ | x1 | x2 | x3 | x4 |
|---|---|---|---|---|---|
| (−2, 0) | $\overleftrightarrow{d}_3$ | −1 | −1 | 1 | 1 |
| (−2, 1) | $\overleftrightarrow{d}_4$ | −2 | −1 | 1 | 2 |
| (−2, 2) | $\overleftrightarrow{d}_5$ | −2 | −2 | 2 | 2 |
| (−1, −1) | $\overleftrightarrow{d}_7$ | 0 | 0 | 0 | 0 |
| (−1, 0) | $\overleftrightarrow{d}_8$ | −1 | 0 | 0 | 1 |
| (−1, −1) | $\overleftrightarrow{d}_9$ | −1 | −1 | 1 | 1 |
| (−1, 2) | $\overleftrightarrow{d}_{10}$ | −2 | −1 | 1 | 2 |
| (0, −2) | $\overleftrightarrow{d}_{11}$ | 1 | 1 | −1 | −1 |
| (0, −1) | $\overleftrightarrow{d}_{12}$ | 0 | 1 | −1 | 0 |
| (0, 0) | $\overleftrightarrow{d}_{13}$ | 0 | 0 | 0 | 0 |
| (0, 1) | $\overleftrightarrow{d}_{14}$ | −1 | 0 | 0 | 1 |
| (0, 2) | $\overleftrightarrow{d}_{15}$ | −1 | −1 | 1 | 1 |
| (1, −2) | $\overleftrightarrow{d}_{16}$ | 1 | 2 | −2 | −1 |
| (1, −1) | $\overleftrightarrow{d}_{17}$ | 1 | 1 | −1 | −1 |
| (1, 0) | $\overleftrightarrow{d}_{18}$ | 0 | 1 | −1 | 0 |
| (1, 1) | $\overleftrightarrow{d}_{19}$ | 0 | 0 | 0 | 0 |
| (2, −2) | $\overleftrightarrow{d}_{21}$ | 2 | 2 | −2 | −2 |
| (2, −1) | $\overleftrightarrow{d}_{22}$ | 1 | 2 | −2 | −1 |
| (2, 0) | $\overleftrightarrow{d}_{23}$ | 1 | 1 | −1 | −1 |

Figure 11:
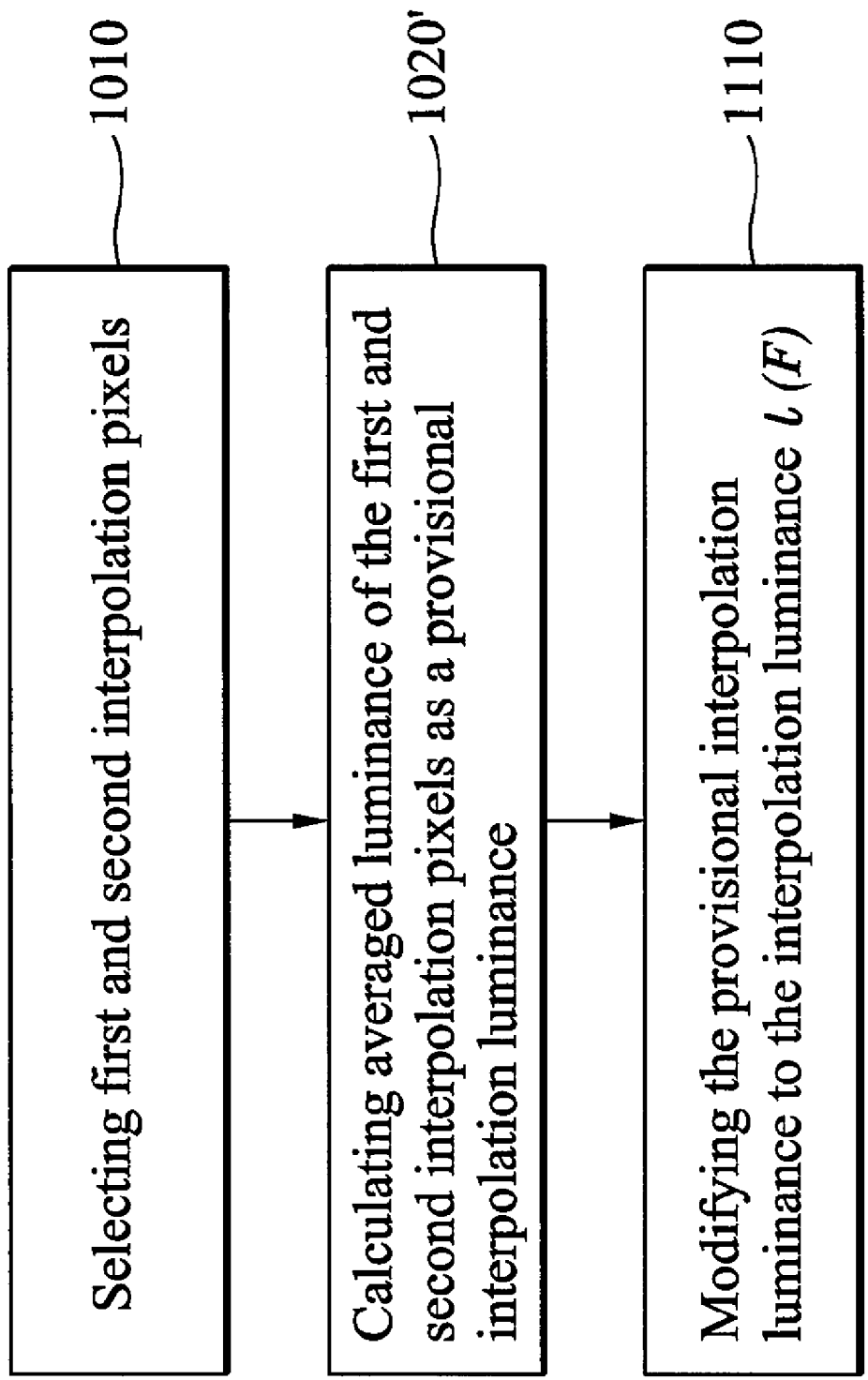
FIG. 11 is a flowchart illustrating acquisition of interpolation luminance of a current interpolated pixel in accordance with a second embodiment of the invention.

FIG. 11 is a flowchart illustrating acquisition of the interpolation luminance of the current interpolated pixel F in accordance with a second embodiment of the invention, differing from FIG. 10 only in step 1020 replaced with the step 1020' and addition of step 1110. Step 1020' resembles step 520, differing only in that the averaged luminance $$\left[\sum_{1 \le i1 \le N1} b(P_{1,i1}) + \sum_{1 \le i2 \le N2} b(P_{2,i2})\right] / (N1 + N2)$$

of the first and second interpolation pixels $P_{1,1}$ to $P1_{1,N1}$ and $P_{2,1}$ to $P1_{2,N2}$ serves as a provisional interpolation luminance $B_P$ rather than the interpolation luminance l(F) of the current interpolated pixel F. Next, in step 1110, the provisional interpolation luminance $B_P$ is modified to the interpolation luminance l(F) of the current interpolated pixel F.

Figure 12:
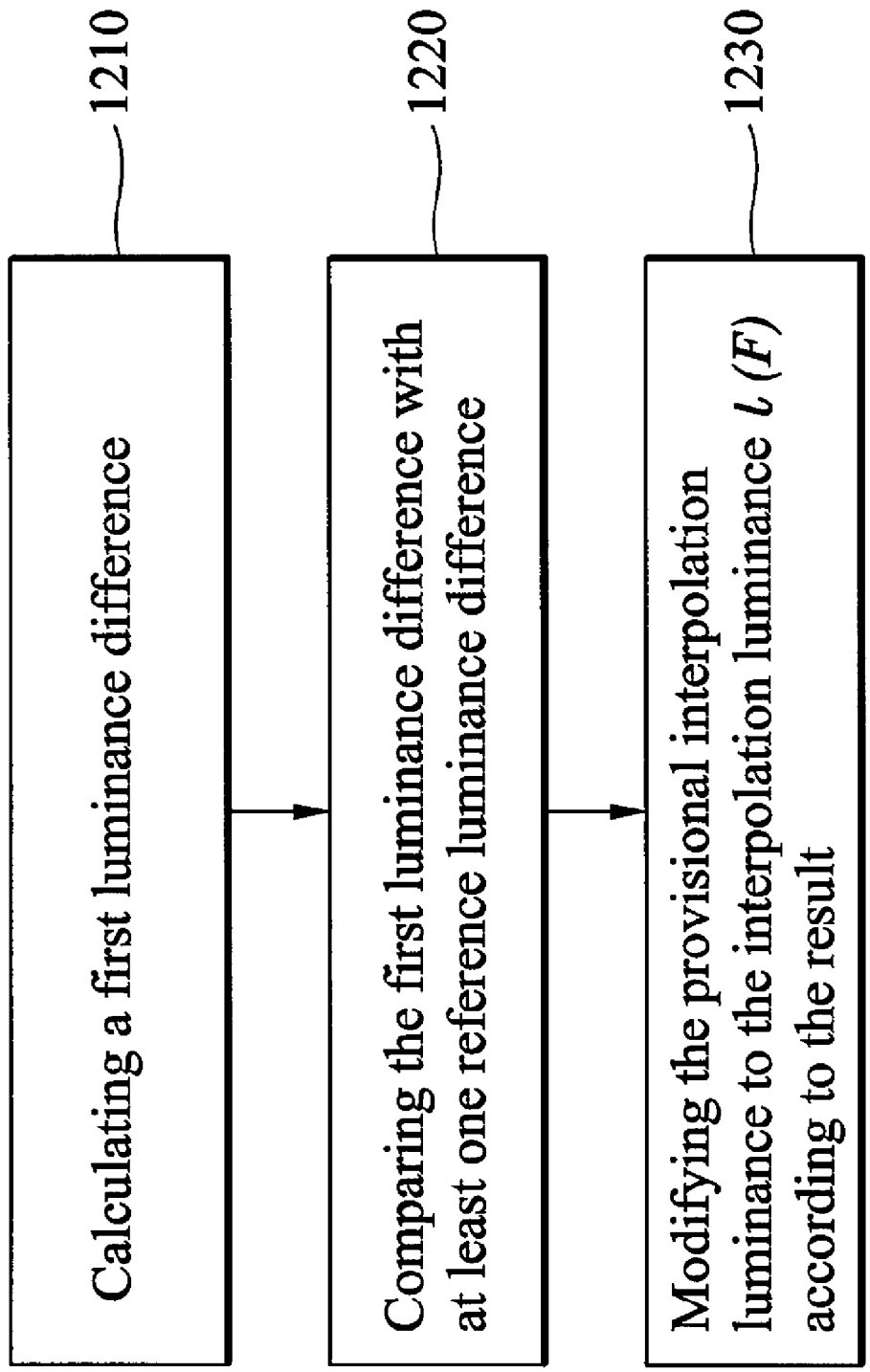
FIG. 12 is a flowchart illustrating modification process of a provisional interpolation luminance to the interpolation luminance.

FIG. 12 is a flowchart illustrating modification of the provisional interpolation luminance $l_P$ to the interpolation luminance. In step 1210, a first luminance difference $l_{D1}=|l_P-l_R|$ is calculated, where $l_R$ is a reference luminance. In step 1220, the first directional difference $l_{D1}$ is compared to at least one reference luminance difference. In step 1230, the provisional interpolation luminance $l_P$ is modified to the interpolation luminance l(F) according to the comparison result. If the reference directional difference comprises a higher reference luminance $l_{RH}$ and a lower reference luminance $l_{RL}$ for example, the provisional interpolation luminance $B_P$ is modified to the reference luminance $l_R$ if the first directional difference $l_{D1}$ exceeds the higher reference luminance $l_{RH}$, to $(B_P+B_R)/2$ if the first directional difference $l_{D1}$ is between the higher and lower reference luminance $l_{RH}$ and $l_{RL}$, or is not modified if the first directional difference is less than the lower reference luminance $l_{RL}$.

Summarly, similarity of luminance decreasing/increasing patterns near the first and second candidate pixels can be obtained as a whole by comparing the first and second luminance difference vectors $\tilde{D}_{U,-1}$ and $\tilde{D}_{L,2}$ of the first and second weighting regions 61 and 62, as described in the first and third embodiments, or can be obtained segmentally by comparing the first and second sub-luminance difference vectors $\tilde{d}_{U,-1,j}$ and $\tilde{d}_{L,2,j}$ of the first and second sub weighting regions $61_j$ and $62_j$ and finally combining the comparison results, as described in the second and fourth embodiments. With consideration of the similarity of luminance decreasing/increasing patterns near the first and second candidate pixels, the problem shown in FIGS. 2A and 2B is overcome in the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image de-interlacing method for estimating an interpolation luminance of an interpolated pixel, comprising:
    selecting a plurality of first and second candidate pixels respectively on upper and lower lines adjacent to the interpolated pixel;
    calculating a plurality of directional differences, a plurality of weighting values and a plurality of weighted directional differences, each associated with one of the first candidate pixels and one of the second candidate pixels, wherein
        each of the directional differences is an absolute luminance difference between the associated first and second candidate pixels,
        each of the weighting values is determined by comparing a first luminance difference vector of a first weighting region with a second luminance difference vector of a second weighting region, the first and second weighting regions respectively residing on the upper and lower lines and comprising the associated first and second candidate pixels, each element of the first and second luminance difference vectors respectively determined according to luminance difference between two pixels associated with the elements in the first and second weighting regions, and
        each of the weighted directional differences is determined according to the directional difference and the weighting value;
    selecting a first selected pixel and a second selected pixel respectively from the first and second candidate pixels associated with the smallest weighted directional difference; and
    obtaining the interpolation luminance according to the first and second selected pixels.

2. The image de-interlacing method as claimed in claim 1, wherein each element in the first and second luminance difference vectors is the luminance difference between two adjacent pixels associated with the element in the first and second weighting regions.

3. The image de-interlacing method as claimed in claim 2, wherein each of the weighting values is determined according to similarity in signs of corresponding elements of the first and second luminance difference vectors.

4. The image de-interlacing method as claimed in claim 3, wherein the weighting values are determined according to first and second luminance difference vectors with element values having higher similarity in signs of corresponding elements are set lower than the weighting values determined according to the first and second luminance difference vectors with element values having lower similarity in signs of corresponding elements.

5. The image de-interlacing method as claimed in claim 3, wherein each of the weighting values is determined further according to whether element absolute values of the first and second luminance difference vectors exceed a predetermined value.

6. The image de-interlacing method as claimed in claim 5, wherein the weighting values determined according to the first and second luminance difference vectors with more corresponding elements having equal signs and more elements having absolute values are set lower than the predetermined value exceed the weighting values determined according to the first and second luminance difference vectors with fewer corresponding elements having equal signs and fewer elements having absolute values greater than the predetermined value.

7. The image de-interlacing method as claimed in claim 1, wherein each of the weighted directional differences is a product of the directional difference and the weighting value.

8. The image de-interlacing method as claimed in claim 1, wherein acquisition of the interpolation luminance according to the first and second selected pixels comprises:
    selecting a first predetermined number of first interpolation pixels in a first interpolation region comprising the first selected pixel;
    selecting a second predetermined number of second interpolation pixels in a second interpolation region comprising the second selected pixel; and
    calculating an averaged luminance of the first and second interpolation pixels as the interpolation luminance.

9. The image de-interlacing method as claimed in claim 1, wherein acquisition of the interpolation luminance according to the first and second selected pixels comprises:
   selecting a first predetermined number of first interpolation pixels in a first interpolation region comprising the first selected pixel;
   selecting a second predetermined number of second interpolation pixels in a second interpolation region comprising the second selected pixel; and
   calculating an averaged luminance of the first and second interpolation pixels as a provisional interpolation luminance;
   modifying the provisional interpolation luminance to the interpolation luminance.

10. The image de-interlacing method as claimed in claim 9, wherein modification of the provisional interpolation luminance to the interpolation luminance comprises:
   calculating an absolute luminance difference between the provisional interpolation luminance and a reference luminance as a first luminance difference;
   comparing the first luminance difference to at least one reference luminance difference; and
   modifying the provisional interpolation luminance to the interpolation luminance according to the comparison result.

11. The image de-interlacing method as claimed in claim 10, wherein the reference luminance difference comprises a higher reference luminance and a lower reference luminance, and modification of the provisional interpolation luminance to the interpolation luminance according to the comparison result comprises:
   modifying the provisional interpolation luminance to the reference luminance if the first luminance difference exceeds the higher reference luminance;
   modifying the provisional interpolation luminance to (the reference luminance+ the provisional interpolation luminance)/2 if the first luminance difference falls between the higher and lower reference luminance;
   using the provisional interpolation luminance as the interpolation luminance if the first luminance difference falls below the lower reference luminance.

12. The image de-interlacing method as claimed in claim 1, wherein each of the weighting values is determined according to a plurality of sub-weighting values, each of the sub-weighting values is determined according to a respective one of a plurality of first sub-luminance difference vector comprising partial elements of the first luminance difference vector and a respective one of a plurality of second sub-luminance difference vectors comprising partial elements of the second luminance difference vector.

13. The image de-interlacing method as claimed in claim 1, wherein the first and second weighting regions respectively comprise a plurality of first sub-weighting regions and a plurality of second sub-weighting regions, each element of each of the first sub-luminance difference vectors is determined according to luminance difference between two points associated with the element in one of the first sub-weighting region associated with the first sub-luminance difference vector, and each element of each of the second sub-luminance difference vectors is determined according to directional difference between two points associated with the element in one of the second sub-weighting region associated with the second sub-luminance difference vector.

14. The image de-interlacing method as claimed in claim 12, wherein each of the weighting values is a product of the sub-weighting values summed by a predetermined offset value.

15. The image de-interlacing method as claimed in claim 13, wherein the first and second sub-weighting regions comprise two regions respectively, each of the two regions comprising the associated first or second candidate pixels and a pixel adjacent thereto.

16. The image de-interlacing method as claimed in claim 13, wherein each element of the second sub-luminance difference vector is determined according to luminance difference between two adjacent points in one of the second sub-weighting region associated with the element.

17. The image de-interlacing method as claimed in claim 16, wherein each of the sub-weighting values is determined according to similarity in signs of corresponding elements of the associated first and second sub-luminance difference vectors.

18. The image de-interlacing method as claimed in claim 16, wherein the sub-weighting values determined according to the first and second sub-luminance difference vectors with higher similarity in signs of corresponding elements are set lower than the weighting values determined according to the first and second sub-luminance difference vectors with lower similarity in signs of corresponding elements.

19. The image de-interlacing method as claimed in claim 18, wherein each of the sub-weighting values is set to one of a plurality of predetermined values based on the number of corresponding elements with equal signs.

20. The image de-interlacing method as claimed in claim 18, wherein each of the sub-weighting values is a first predetermined weighting value or a second predetermined weighting value greater than the first predetermined weighting value if the corresponding elements are all equal or unequal respectively.

21. The image de-interlacing method as claimed in claim 17, wherein each of the weighting values is determined further according to whether element absolute values of the associated pair of elements exceed a predetermined value.

22. The image de-interlacing method as claimed in claim 21, wherein the sub-weighting values determined according to the first and second sub-weighting vectors with more corresponding elements having equal signs and more elements having absolute values are set lower than the predetermined value exceed the weighting values determined according to the first and second sub-weighting vectors with fewer corresponding elements having equal signs and fewer elements having absolute values greater than the predetermined value.

23. The image de-interlacing method as claimed in claim 22, wherein each of the sub-weighting values is a first predetermined weighting value if the elements of the first and second sub-weighting vectors are all equal in signs and are all greater than the predetermined value, a second predetermined weighting value if the elements of the first and second sub-weighting vectors are unequal in signs and are all greater than the predetermined value, or otherwise, a third predetermined weighting value, wherein the second predetermined value exceeds the third predetermined value, and the third predetermined value exceeds the first predetermined value.

24. An image de-interlacing method for estimating an interpolation luminance of an interpolated pixel, comprising:
   selecting a plurality of first and second candidate pixels respectively on upper and lower lines adjacent to the interpolated pixel;
   calculating a plurality of directional differences, a plurality of weighting values and a plurality of weighted directional differences, each associated with one of the first candidate pixels and one of the second candidate pixels, wherein each of the directional differences is an absolute luminance difference between the associated first and second candidate pixels, each of the weighting values is determined by comparing similarity of luminance decreasing/increasing patterns near the associated first and second candidate pixels on the upper and lower lines, and each of the weighted directional differences is determined according to the directional difference and the weighting value;

selecting a first selected pixel and a second selected pixel respectively from the first and second candidate pixels associated with the smallest weighted directional difference; and obtaining the interpolation luminance according to the first and second selected pixels.

* * * * *